S. S. SWANSON.
HARROW.
APPLICATION FILED DEC. 20, 1912.
1,095,971.
Patented May 5, 1914.
3 SHEETS—SHEET 1.
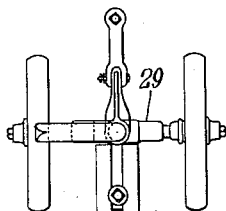
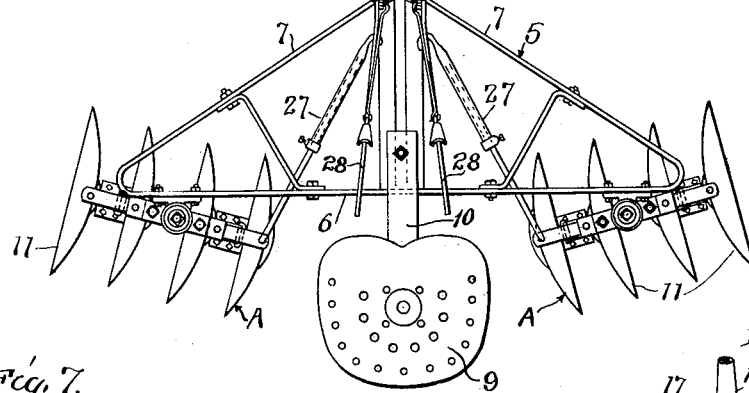
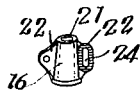
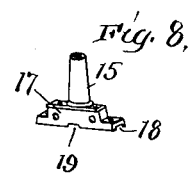
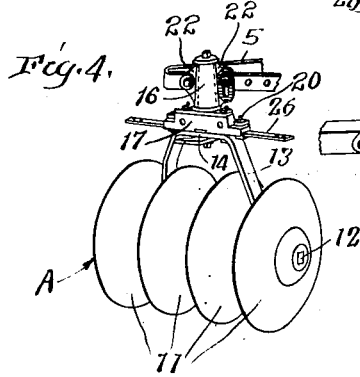
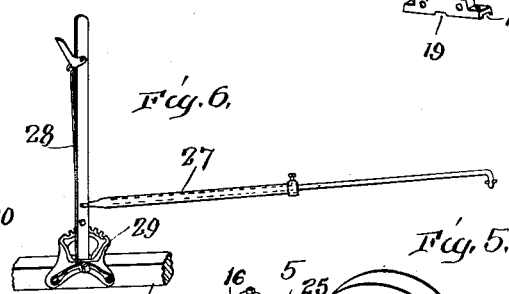
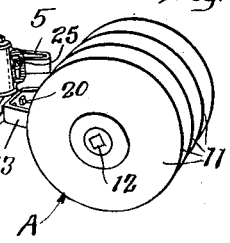
Inventor
Starley S. Swanson,
Witnesses
By Toulmin Reed
Attorneys

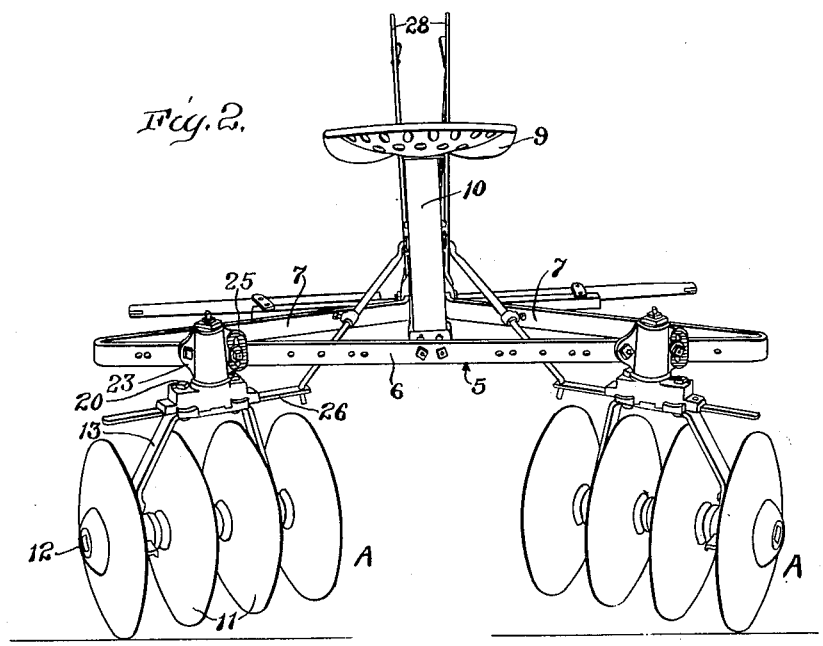
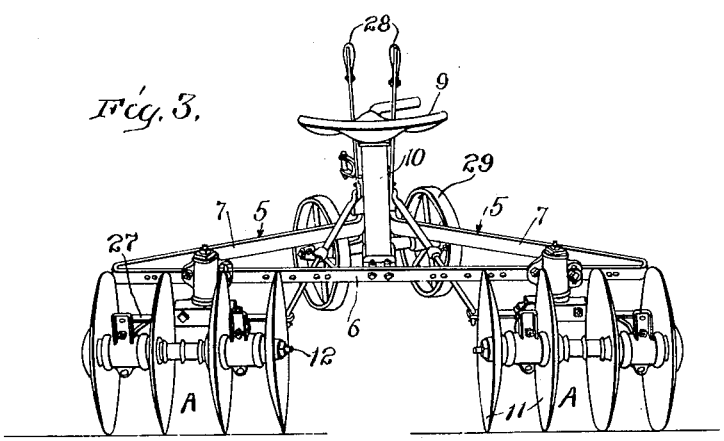

S. S. SWANSON.
HARROW.
APPLICATION FILED DEC. 20, 1912.
1,095,971.
Patented May 5, 1914.
3 SHEETS—SHEET 3.
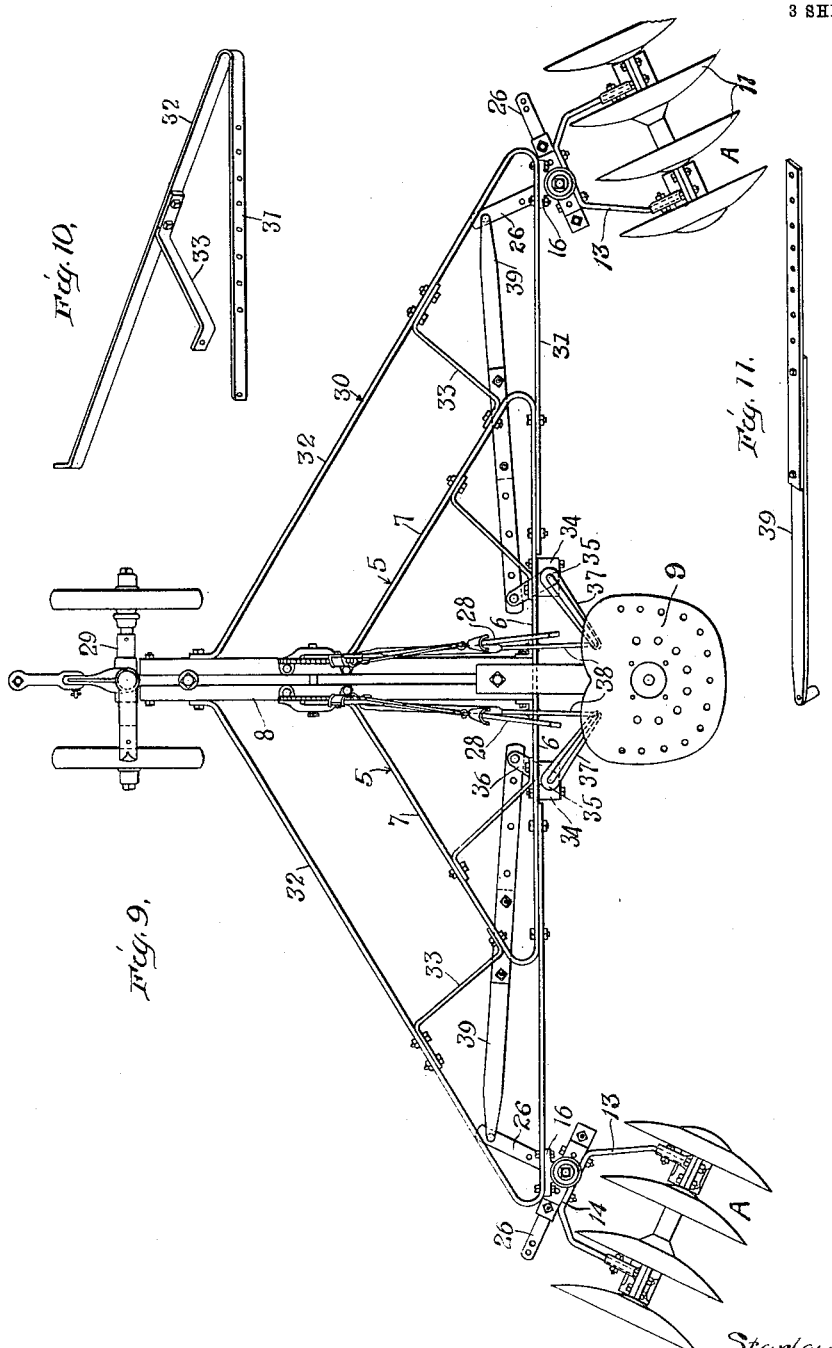

UNITED STATES PATENT OFFICE.

STARLEY S. SWANSON, OF BELLEVUE, OHIO.

HARROW.

1,095,971.  Specification of Letters Patent.  Patented May 5, 1914.

Application filed December 20, 1912. Serial No. 737,797.

*To all whom it may concern:*

Be it known that I, STARLEY S. SWANSON, a citizen of the United States, residing at Bellevue, in the county of Huron and State of Ohio, have invented certain new and useful Improvements in Harrows, of which the following is a specification, reference being had therein to the accompanying drawing.

This invention relates to new and useful improvements in agricultural implements of that type commonly known as riding harrows.

In certain sections of the country where oranges and cotton are raised, it is necessary on account of the low branches of the orange trees to employ a low harrow frame for cultivating between the rows of trees, and in cultivating cotton it is necessary to employ a high harrow frame so as to permit the same to readily pass over the plants. As a result, it has been necessary heretofore to employ two forms of harrows for the above mentioned operations.

The principal object of my invention is therefore to provide a harrow which includes a main frame and an earth engaging tool which supports the frame, and which is adjustably connected relatively thereto, so that the height of the frame relative to the ground may be readily varied to accommodate the implement to either of the uses above noted.

Another object of the invention is to provide an implement of the character described which includes one or more disk gangs that are mounted for horizontal swinging movements upon the frame, and to provide means for holding each gang at a predetermined angle with respect to the line of draft whereby the gangs will be caused to throw the earth either toward or away from the line of work.

A further object of the invention is to provide a novel connection between the frame and each gang whereby the angle of the gang may be readily adjusted with respect to the frame to facilitate forming a hill of any desired angle.

In the accompanying drawings, Figure 1 is a top plan view of a harrow showing one embodiment of my invention, and showing the disk gangs arranged to retain the main frame in its elevated position, Fig. 2 is a rear view thereof, Fig. 3 is a similar view slightly reduced, but showing the main frame in its lowermost position, Fig. 4 is a detail perspective view showing the connection arranged between the frame and gang for retaining the frame in its elevated position, Fig. 5 is a similar view, but showing the connection arranged for retaining the frame in its lowermost position, Fig. 6 is a detail perspective view of one of the hand levers for controlling the horizontal swinging movements of the gangs, Fig. 7 is a detail perspective view of one of the sockets, Fig. 8 is a detail perspective view of one of the spindles, Fig. 9 is a top plan view of a modified form of my invention, Fig. 10 is a detail perspective view of one of the extension members of the main frame, and Fig. 11 is a detail perspective view of one of the adjustable links employed in the connections for adjusting the horizontal swinging movements of the gangs.

In the accompanying drawings, there is shown a main frame 5, which in this instance, is formed from a single length of bar metal, bent intermediate its ends to form a base 6, and converging sides 7—7. A draft bar 8 has its rear end connected to the base 6 and has its forward portion disposed intermediate and connected to the ends of the sides 7—7. An operator's seat 9 is mounted upon a suitable standard 10 which is supported upon the rear end of the draft bar 8. While the draft bar 8 is shown as being formed by two spaced parallel bars, it is obvious that a single bar may be employed if so desired.

Secured to the base 6 of the main frame and preferably at either side of the draft bar 8 is a disk gang A, the disks 11 of each gang being suitably mounted upon an axle 12. These gangs are adapted to be connected to the main frame so that said frame may either be disposed in close proximity to the ground or in an elevated position thereabove, depending of course upon the nature of the work to which the harrow is to be subjected. In order to so connect each gang with the frame, each axle 12 is provided with a yoke 13 having an angular connecting portion 14. This yoke is adapted to be connected to the frame through the medium of a spindle 15, and a socket element 16. The spindle 15 is disposed in a substantially vertical plane and is provided at its lower end with a transverse and substantially angular base 17. The under side of the base 17 is formed with a longitudinal channel 18 and with a centrally disposed transverse channel 19. The base 17 is formed at each side of the spindle 15, with bolt-receiving openings which are arranged at right angles to each other. When it is desired to connect the gangs A to the frame 5 so that said frame will be in its lowermost position, the yokes 13 are disposed in a substantially horizontal plane and the connecting portions 14 thereof are disposed against the rear faces of the bases 17 and secured thereto by bolts 20, as is clearly shown in Figs. 3 and 5 of the drawings. When it is desired to connect the gangs 14 with the frame 5 so that the frame will be disposed in its elevated position the yokes 13 are disposed in a vertical plane and have their connecting portions 14 disposed against the underfaces of the bases 17 and secured thereto by the bolts 20, as is clearly shown in Figs. 2 and 4 of the drawings. It will thus be observed that the socket and spindle constitute a connecting device which is carried by the main frame, and includes two points of connection arranged at an angle one to the other, and that the tool is formed with a part, namely the connecting portion of the yoke, which is adapted to be secured to said connecting device at either of said points.

Each socket element 16 is formed with an open ended socket 21 for receiving a spindle 15, and each element is furthermore formed with opposed laterally extending ears 22—22. One of these ears is pivotally connected to the base 6 of the main frame by means of a bolt 23, and the other ear is formed with an elongated opening 24 through which passes a bolt 25 that is carried by the base 6 and is adapted to hold said element in any adjusted position upon its fulcrum 23. It will thus be observed that by adjusting the bearing element 16 upon its fulcrum 23, the angle of the respective disk gang A, relative to the frame 5 may be accomplished and as a result, the slope of the hill to be formed or the slope of the irrigating ditches, may be easily obtained.

In order to set the gangs A at any desired angle with respect to the line of draft, and thereby throw the earth toward or away from the line of work, each base 17, is provided with a sectional lever 26, which is disposed within the longitudinal channel 18 and retained therein through the clamping action of said base 17 and yoke 13. This lever extends beyond the ends of the base 17, and either end of the lever is adapted to be connected to one end of an extensible link 27. Each link is pivotally connected to an operating lever 28, which is fulcrumed upon the drag bar 8 in advance of the seat 9, and this lever coöperates with a segment 29, which is carried by the drag bar 8, in the usual manner. It will thus be observed that when one end of the lever 26 is connected with the link 27, the disk-gang A is held at one angle with respect to the line of draft, and when the link is connected to the other end of the lever 26, the disk-gang A is held at the opposite angle. The angle of the gang may be furthermore slightly shifted by the operating lever 28, the amount of shift being regulated by the throw of the lever 28.

The base 6 of the main frame is formed with a series of openings for attaching the socket elements 16 toward or away from the center of the frame. This permits the operator to regulate the spacing of the disk-gangs to accommodate the implement to rows of different widths. The draft bar 8 extends in advance of the main frame 5 and is supported at its front end by a truck 29 of any suitable character, although the truck may be dispensed with if desired.

In the embodiment of my invention as shown in Figs. 9, 10 and 11, the main frame 5 is widened by the attachment of extension frame members 30—30. Each frame member 30 is bent intermediate its ends to form a base 31 and an inclined side 32, the former being connected to one side of the base 6 of the main frame 5, and the latter being connected at its forward end to the draft bar 8 in advance of the side members 7 of said main frame. The members 30 are rigidly connected to the main frame 5 through the medium of suitable braces 33. The socket elements 16 are adjustably mounted on the bases 31 of said extension members in a manner similar to that previously described. One of the sections of the lever 26 is withdrawn from its position and is clamped within the transverse channel 19 of the base 17 of the spindle. Attached to the base 6 of the main frame 5 in close proximity to the draw bar 8 are bearing blocks 34—34, and journaled in each block is a vertical crankshaft 35 having laterally extending crank arms 36 and 37, said arms being disposed at right angles to each other. Each arm 37 is pivotally connected to the adjacent hand lever 28 by means of a link 38, and each arm 36 is connected to a respective section of the lever 26 by means of an extensible link 39. In practice, when it is desired to adjust the angle of either disk-gang A the lever 28 is shifted, and as a result the link 38 will rock the shaft 35. The arm 36 of the shaft will, through the medium of the link 39 and the section of the lever 26, swing the disk-gang A upon its spindle. This construction is especially advantageous in cultivating between rows which are spaced a good distance apart, as will be readily understood.

I claim—

1. In an agricultural implement, the combination, with a main frame, and an earth-engaging and frame-supporting tool, of a connecting device carried by said main frame and having a plurality of non-circular bearing surfaces arranged at an angle one to the other about a substantially horizontal axis, said tool having a part adapted to engage and to be secured to any one of said bearing surfaces, whereby the connection between said tool and said frame may be adjusted to support said main frame at different heights.

2. In an agricultural implement, the combination with a main frame, of a combined earth-engaging and frame-supporting tool including a yoke, a spindle journaled on said frame to rotate about a substantially vertical axis, and means for connecting the yoke in either a horizontal or vertical plane to said spindle to alternately vary the height of the frame relative to the ground.

3. In an agricultural implement, the combination with a main frame, of a spindle carried by the frame, an earth-engaging tool, and a connection between the spindle and the tool for varying the height of said frame relative to the ground.

4. In an agricultural implement, the combination with a main frame, of a spindle mounted on said frame upon a horizontal pivot, an earth-engaging tool, and a connection between the spindle and the tool for varying the height of said frame relative to the ground.

5. In an agricultural implement, the combination with a main frame, of a spindle mounted on the frame upon a horizontal pivot, an earth-engaging tool, a yoke connected to the tool, and means for connecting the yoke at different angles to the spindle to vary the height of said frame relative to said ground.

6. In an agricultural implement, the combination with a main frame, of a horizontal pivot carried by the frame, a socket element including a normally vertical socket fulcrumed on said pivot, means for locking said element to the frame in an adjusted relation about said pivot, a spindle journaled in said element, an earth-engaging tool, and a connection between the spindle and tool for varying the height of the frame relative to the ground.

7. In an agricultural implement, the combination with a main frame, of a normally vertical spindle connected to the frame for rotation, one end of the spindle being formed with a transversely disposed base, an earth-engaging tool including an axle, and a yoke connected to the axle including a connecting portion, the connecting portion of said yoke being adapted to be connected to either one of two points of the base to vary the height of the frame relative to the ground.

8. In an agricultural implement, the combination with a main frame, of a normally vertical spindle connected to the frame for rotation, one end of the spindle being formed with a transversely disposed angular base, an earth-engaging tool including an axle, and a yoke connected to the axle including an angular connecting portion, the connecting portion of the yoke being adapted to be connected to either one of two sides of the base to vary the height of the frame relative to the ground.

9. In an agricultural implement, a frame, a connecting device carried by said frame and adjustable about a vertical axis, an earth-engaging tool having means for securing the same to said connecting device at different angles to vary the height of said frame relative to the ground.

In testimony whereof, I affix my signature in presence of two witnesses.

STARLEY S. SWANSON.

Witnesses:
E. H. ERDRICH,
E. A. KEMP.